United States Patent [19]

Burke

[11] 4,165,401

[45] Aug. 21, 1979

[54] RECOVERY OF SUSPENDED PARTICULATE METAL FROM QUENCH WATER

[75] Inventor: Zane L. Burke, Whittier, Calif.

[73] Assignee: Davis Walker Corporation, Commerce, Calif.

[21] Appl. No.: 828,618

[22] Filed: Aug. 29, 1977

[51] Int. Cl.² .............................................. C23C 1/00
[52] U.S. Cl. .................................. 427/398 B; 210/71; 210/167; 427/241; 427/345; 427/406; 427/433
[58] Field of Search .................... 210/167, 71; 134/10, 134/13; 427/433, 241, 406, 398.13, 345

[56] References Cited

U.S. PATENT DOCUMENTS

| | | |
|---|---|---|
| 1,580,723 | 4/1926 | Hapgood ................... 134/10 |
| 2,785,999 | 3/1957 | Ruthner ..................... 134/13 |
| 3,252,882 | 5/1966 | Williams .................... 210/167 X |
| 3,764,265 | 10/1973 | Fijalkowski ............... 134/10 X |
| 3,809,570 | 5/1974 | Herman ..................... 427/433 X |
| 3,860,438 | 1/1975 | Shoemaker ................ 427/433 X |
| 3,914,481 | 10/1975 | Bostroem .................. 427/433 X |

*Primary Examiner*—Frank A. Spear, Jr.
*Attorney, Agent, or Firm*—Christie, Parker & Hale

[57] ABSTRACT

Articles to be galvanized, such as wire or chain link fencing, are passed in sequence through an acid bath, a water rinse, a flux bath, a molten zinc bath, and a water quench bath. The quench bath becomes heavily contaminated with suspended, particulate zinc which renders the water unfit for discharge to a sewer or for passage through a cooling tower for recycling. Zinc contamination in the zinc quench water is reduced by centrifuging the water. The treated water is cooled to recycling to the quench bath. When a molten lead bath followed by a water quench bath is used to anneal articles such as wire strands before they are galvanized, lead contamination in the lead quench water is also reduced by centrifuging the water. The zinc and lead removed from the quench water streams are recovered and recycled.

19 Claims, 2 Drawing Figures

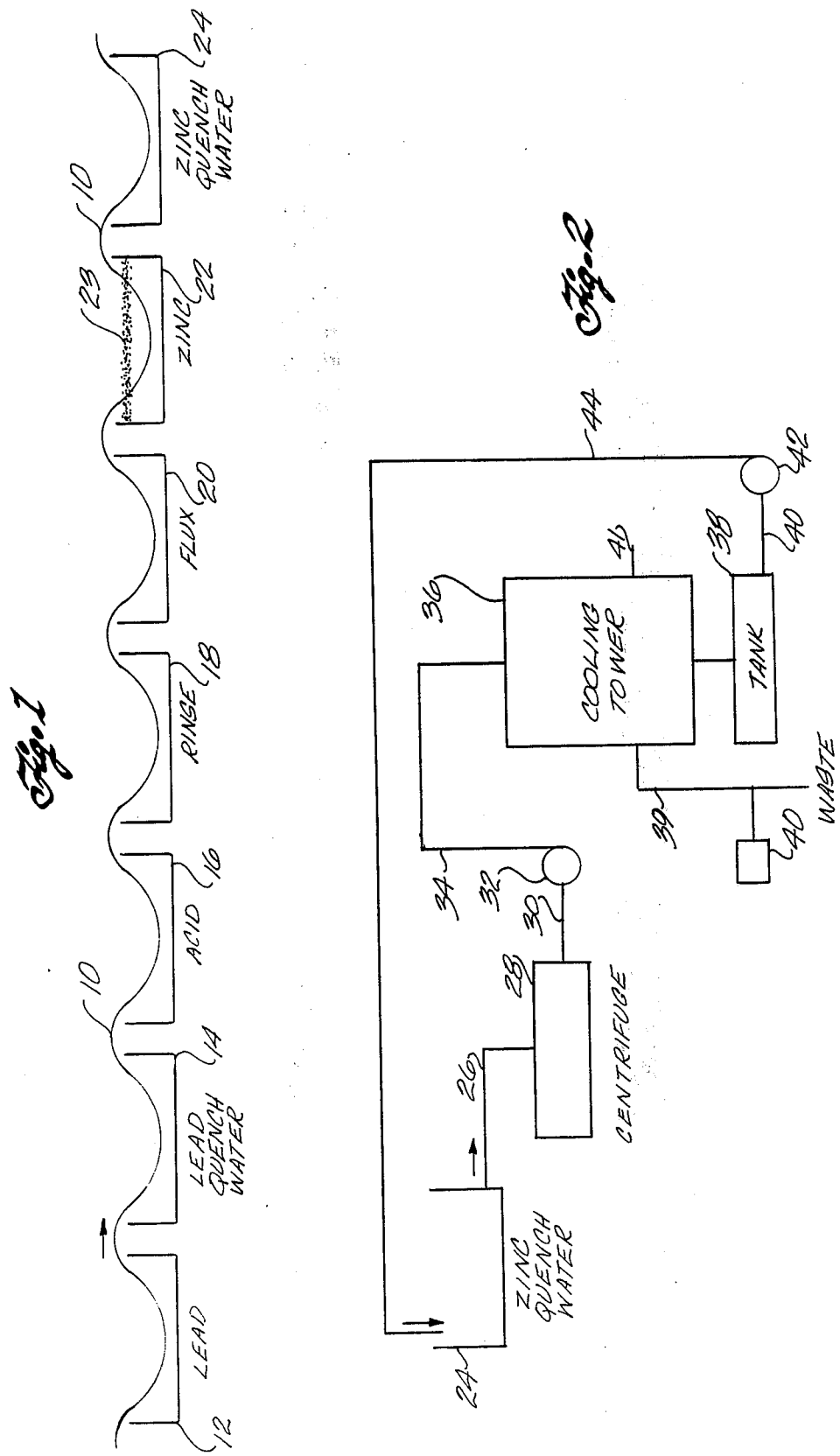

RECOVERY OF SUSPENDED PARTICULATE METAL FROM QUENCH WATER

BACKGROUND OF THE INVENTION

This invention relates to the removal of metal contamination from water used to quench articles that have been dipped in molten metal baths. More particularly, this invention relates to the removal of zinc and lead contamination from quench water streams produced in the galvanizing of articles such as chain link fencing and in the annealing and galvanizing of articles such as wire strand.

A number of processes for the treatment of metal articles such as steel chain link fencing, iron or steel wire or copper wire, involve passing the articles through a bath of one or more molten metals, for example, lead, zinc, tin or antimony or mixtures of such metals, and quenching the dipped articles in relatively cool water. The articles are dipped in the molten metal to provide a metal coating thereon. U.S. Pat. No. 2,456,235 describes one such process, in which properly prepared iron or steel is dip-coated in a molten mixture of lead and antimony and then quenched in water. Another example is the tinning of copper wire or other articles, which involves coating the copper with a mixture of lead and tin.

Articles are also dipped in molten metal to anneal them. For example, steel wire is passed through a bath of molten lead maintained at an annealing temperature. The lead does not form a continuous coating on the wire because the wire has not been suitably prepared and fluxed to be wetted by the molten lead. Nevertheless, some molten lead clings to the wire when it is removed from the bath. The wire is then quenched in water, and lead contaminates the water.

The galvanizing of iron and steel by dip-coating in molten zinc is a process of major commercial importance. Galvanized articles such as roofing nails, buckets, fence posts, bailing wire, chain link fence, nuts, bolts, chicken wire, wire mesh, reinforcing plates, etc. are in common use. Such articles are galvanized either on a batch or a continuous basis.

In a typical galvanizing process, an article such as chain link is passed continuously through an acid cleaning bath, a water rinse bath to remove acid, a flux bath, a molten zinc bath, and a quench water bath. To conserve water, it has been customary to circulate water from a source such as a city water line through the zinc quench water tank, then through the water rinse taken where acid is removed from the article, and then to a waste line. Where a lead annealing bath and lead quench water tank are used, a portion of the zinc quench water is directed to the lead quench tank, and then to the waste line. When the quench water mixes with the acidic rinse water in the rinse tank or in the waste line, zinc and lead in the water dissolve.

Efforts to remove such dissolved metal contamination from the effluent have centered on chemical or electrolytic processes for removing metal from the combined effluent stream.

To this inventor's knowledge, it has not heretofore been appreciated that the metal contamination in the effluent is first present as suspended, particulate zinc or lead in the quench water, which dissolves when the metal-laden quench water is mixed with water from the rinse bath.

SUMMARY OF THE INVENTION

In accordance with this invention, quench water from a metal dipping operation, ie water that has been used to quench articles that have been dipped in molten metal, which is contaminated with suspended, particulate metal, is centrifuged in order to remove substantially all of the suspended metal contamination. The centrifuged water is discharged to a sewer or is used for rinsing or quenching. In a preferred embodiment of this invention, quench water is continuously recirculated in sequence through a quench bath, a centrifuge, and a cooling means and is returned to the quench bath. The conductivity of the recirculated water is monitored and regulated to avoid the dissolution and consequent buildup of dissolved metal contamination in the water.
dr

BRIEF DESCRIPTION OF THE DRAWINGS

FIG. 1 is a schematic diagram of a typical galvanizing operation involving both a lead annealing bath and a zinc coating bath.

FIG. 2 schematically depicts the quench water recycling system of the present invention as applied to zinc quench water.

DETAILED DESCRIPTION OF THE INVENTION

The invention will be described in detail with reference to a galvanizing process involving both a molten lead annealing bath and a molten zinc coating bath. However, it will be apparent that the invention is, in its broader aspects, applicable to other molten metal dipping operations wherein quench water becomes contaminated with suspended, particulate metal.

Referring now to FIG. 1, steel wire 10 to be galvanized is passed in sequence continuously through a series of baths. The first bath is a molten lead bath 12 which is maintained at an annealing temperature for the wire. The steel wire strand 10 passes from the lead bath into a lead quench water bath 14 which cools the wire and in the process becomes contaminated with suspended, particulate lead that is carried over on the wire from the molten lead bath 12. When the wire is quenched, evolution of steam at the surface of the hot wire tends to dislodge some of the lead clinging to the wire and break up the lead into very fine particles.

The wire then passes through an acid cleaning bath 16, typically hydrochloric acid, and then a water rinse bath 18. After the water rinse, the wire passes through a flux bath 20, typically zinc ammonium chloride, and then into the molten zinc bath 22. A layer of charcoal 23 is often floated on top of the molten zinc to reduce the loss of zinc by vaporization and to reduce oxidation of the zinc in the bath. The hot wire coated with molten zinc is then passed into the zinc quench water bath 24. Again, violent evolution of steam at the surface of the hot wire as it is plunged into the quench water causes fine particles of zinc to become suspended in the quench water.

Refering now to FIG. 2, a quench water stream contaminated with suspended, particulate zinc is continuously removed from the zinc quench water bath 24 through line 26 and admitted to a centrifuge 28. The centrifuge is operated under such conditions of flow rate and speed as to provide sufficient centrifugal force to remove substantially all of the suspended, particulate zinc in the quench water. When a layer of charcoal 23 is used to protect the zinc from evaporation and oxidation, the zinc quench water also becomes contaminated with particulate charcoal. Both the charcoal particles and the zinc particles are removed from the water and accumulate in the centrifuge in the form of a sludge which can be removed periodically from the centrifuge. Desirably, two centrifuges or two interchangeable centrifuge bowls are provided so that the water can be centrifuged continuously with little or no interruption for cleaning of the centrifuge. Centrifuged water leaving the centrifuge through line 30 is pumped by pump 32 through line 34 to a cooling tower 36. In the cooling tower, the water is cooled to a desired quench temperature, usually approximately ambient temperature, e.g. between about 60° and 100° F. It then flows to surge tank 38 from which it is pumped by pump 42 back to the zinc quench water bath.

Fresh makeup water is periodically admitted to the system through line 41. A waste blowdown stream is periodically removed from the cooling tower through line 39 under the control of a water condition monitor 40, which can be made responsive to the pH, the dissolved metal content or, preferably, the conductivity of the water as desired.

The rates of fresh water addition and blowdown removal are adjusted to keep the mineral content of the water below a prescribed maximum so as to avoid fouling of the cooling tower and to regulate the pH of the water within prescribed limits so as to control the buildup of an undesirable amount of dissolved metal, e.g., zinc, in the quench water bath. This assures that substantially all of the zinc contamination in the water is in the form of suspended, particulate zinc which can be removed by the centrifuge rather than in the form of dissolved zinc which must be removed by chemical or electrolytic treatments.

The pH of the recirculating quench water is maintained within a range, e.g. between about 2 and 12, that does not result in the dissolution of any substantial amount of metal. The dissolved metal content of recirculated quench water is maintained at less than about 5 parts per million, and preferably less than about 1 part per million. The permissable range of pH depends on the metal present in the water, on the desired maximum dissolved metal concentration, the temperature, the recirculation rate, etc., and can readily be ascertained by monitoring the dissolved metal concentration of the water. However, in practice, the addition and removal of water to control mineral buildup will also maintain a desirable pH.

An arrangement identical to that shown in FIG. 2 can be used to treat the lead quench water from lead quench bath 14. Although both the lead quench water and the zinc quench water can be treated together in the same system, it is desirable to treat them in separate systems so that the lead and the zinc are recovered separately and are more easily refined for recovery.

Depending upon the operating details of a particular galvanizer, the water removed from the zinc and lead quench baths may contain as much as 200 parts per million or more of suspended, particulate metal. The water from a properly operated centrifuge will usually have less than 5 parts per million suspended metal, often less than 1.5 parts per million. Any centrifuge that can generate sufficient centrifugal force for removing the suspended, particulate metal from the quench water may be used in the practice of this invention. Useful centrifuges and their principles of operation are described in Perry's Chemical Engineers' Handbook, Fourth Edition (New York: McGraw-Hill, Inc. 1963) pages 19–86 to 19–100. Suitable centrifuges are commercially available.

The required centrifugal force for removing the metal contaminant depends in part upon what degree of purity is required and in part upon the desired flow rate through the centrifuge. Where a low flow rate can be tolerated, a centrifuge developing relatively low centrifugal force will remove a substantial portion of the suspended metal. Where a higher flow rate is desired, higher centrifugal force is required to remove the suspended, particulate metal. As a practical matter, any commercial centrifuge capable of developing centrifugal forces of between about 500 and about 2200 times the force of gravity at the desired flow rate will be adequate. By way of example only, the suspended zinc content of quench water has been reduced from 40 to 60 parts per million down to 1 to 1.3 parts per million with the use of a centrifuge having a 20 inch bowl developing 900 times the force of gravity at a flow rate of about 25–30 gallons per minute. Even more effective removal of suspended lead can be expected because of the greater density of lead.

Any conventional cooling means, such as a cooling tower, with enough capacity to provide the desired final temperature for the quench water is useful in the practice of this invention. To prevent the buildup of salts and consequent fouling of the cooling tower, a small blowdown stream is withdrawn through line 39 and discarded. The blowdown stream may amount to as little as 1 percent of the total volume of water in the recirculating quench system and is substantially free of suspended particulate metal. Thus, in addition to reducing the suspended lead and zinc content in the aqueous waste from galvanizer systems, this invention provides a method for substantially reducing the volume of the aqueous waste that is discharged to the sewer system.

In addition to the benefits of saving water and greatly reducing the discharge of metals, this invention also provides for the recovery of metal that would otherwise be wasted. Lead which is recovered from lead quench water is clean and can be dried and recycled directly to the molten lead bath or can be sold to a lead refiner. When a layer of carbon is used to protect the zinc in the molten zinc bath, the zinc quench water becomes contaminated with particulate zinc and particulate carbon, both of which are removed from the quench water in the form of a firm cake. The zinc in the cake is also contaminated with zinc oxide. The zinc rich sludge must be refined before the zinc can be reused. Methods for refining zinc, such as smelting and electrolytic refining, are known and need not be disclosed herein. For convenience, the zinc rich cake, which is 30 to 50 percent water and is over 50 percent zinc by weight on a dry basis, can be sold to a metal refiner or exchanged for refined zinc.

It has been found in accordance with the practice of this invention that centrifuging alone is sufficient to render lead and zinc quench water fit for discharge to sewer systems or for recirculation through cooling towers to quench baths. If even more complete removal of suspended metal is required, a second, higher speed centrifuge or a filter may be used to remove the last traces of suspended metal.

Although the present invention has been described with reference to particular details and embodiments thereof, these particulars are intended only to illustrate the invention, the scope of which is defined in the following claims.

What is claimed is:

1. In the method of treating articles in which the articles are passed through a bath of molten metal and then through a water quench bath for cooling and in which the water quench bath becomes contaminated with suspended, particulate metal carried over from the molten metal bath, the improvement which comprises removing suspended metal contaminant from quench water by centrifuging contaminated quench water.

2. The method of claim 1 in which centrifuged water is continuously cooled and recirculated to the quench bath.

3. The method of claim 2 in which the pH of the quench water is regulated to avoid the buildup of dissolved metal therein.

4. The method of claim 1 in which metal removed by centrifuging is recovered.

5. The method of claim 1 in which the centrifuged water contains less than about 5 parts per million of suspended metal.

6. In the method of galvanizing articles in which articles are passed through a bath of molten zinc and are then passed through a water quench bath for cooling and in which the quench water becomes contaminated with zinc, the improvement which comprises removing suspended zinc from the quench water by centrifuging the contaminated quench water.

7. The method of claim 6 in which centrifuged water is continuously cooled and recirculated to the quench bath.

8. The method of claim 7 in which the pH of the quench water is regulated to avoid the buildup of dissolved zinc therein.

9. The method of claim 6 in which the centrifuged quench water contains less than about 5 parts per million of zinc.

10. In the method of treating metal articles in which articles are annealed in a bath of molten lead and are then passed through a water quench bath for cooling and in which the quench water becomes contaminated with lead, the improvement which comprises removing suspended lead from quench water by centrifuging contaminated quench water.

11. The method of claim 10 in which centrifuged quench water is continuously cooled and recirculated to the quench bath.

12. The method of claim 11 in which the pH of the water is regulated to avoid the buildup of dissolved lead therein.

13. The method of claim 10 in which lead removed from the quench water is returned to the molten lead bath.

14. The method of claim 10 in which the centrifuged water contains less than about 5 parts per million of suspended lead.

15. A continuous process for galvanizing wire article which comprises continuously passing wire article through a bath of molten zinc and then through a zinc quench water bath;

continuously drawing a zinc quench water stream contaminated with suspended, particulate zinc from the zinc quench water bath;

centrifuging the zinc quench water stream to remove suspended, particulate zinc;

cooling centrifuged zinc quench water; and continuously recirculating cooled zinc quench water to the zinc quench water bath while regulating the pH of the quench water to control the buildup of dissolved zinc therein.

16. The process of claim 15 in which the centrifuged zinc quench water contains less than about 5 parts per million of suspended zinc.

17. The process of claim 15 in which the wire article is chain link.

18. The process of claim 15 comprising the steps of passing wire article through a molten lead bath and then a lead quench water bath before passing the wire article through the molten zinc bath;

continuously drawing a lead quench water stream from the lead quench water bath;

centrifuging the lead quench water stream to remove lead;

cooling centrifuged lead quench water; and continuously recirculating cooled lead quench water to the lead quench water bath while regulating the pH of the water to control the buildup of dissolved lead therein.

19. The process of claim 18 in which the wire article is strand.

* * * * *